(12) United States Patent
Ravary et al.

(10) Patent No.: US 7,214,358 B2
(45) Date of Patent: May 8, 2007

(54) LOW ENERGY REGENERABLE SO₂ SCRUBBING PROCESS

(75) Inventors: Patrick M. Ravary, Dalkeith (CA); John Nicolas Sarlis, Chomedey (CA); Paul Joseph Parisi, St-Lambert (CA); Leo E. Hakka, Montreal (CA)

(73) Assignee: Cansolv Technologies Inc., Montreal, Quebec (CA)

( * ) Notice: Subject to any disclaimer, the term of this patent is extended or adjusted under 35 U.S.C. 154(b) by 443 days.

(21) Appl. No.: 10/639,678

(22) Filed: Aug. 13, 2003

(65) Prior Publication Data

US 2005/0034600 A1 Feb. 17, 2005

(51) Int. Cl.
*B01D 53/50* (2006.01)
(52) U.S. Cl. .................. 423/242.1; 423/242.2; 423/242.7; 423/243.01; 423/243.11; 423/243.12
(58) Field of Classification Search ............. 423/242.1, 423/242.2, 242.7, 243.01, 243.11, 243.12
See application file for complete search history.

(56) References Cited

U.S. PATENT DOCUMENTS

| | | | |
|---|---|---|---|
| 2,722,500 A | 11/1955 | Rippie et al. | |
| 3,848,057 A | 11/1974 | Leder et al. | |
| 4,080,423 A | 3/1978 | Smith et al. | |
| 4,153,674 A | 5/1979 | Verloop et al. | |
| 4,208,387 A | 6/1980 | Conrad et al. | |
| 4,618,481 A | 10/1986 | Heinzelmann et al. | |
| 4,961,873 A | 10/1990 | Ho et al. | |
| 5,017,350 A | 5/1991 | Hakka et al. | |
| 5,019,361 A | 5/1991 | Hakka | |
| 5,108,723 A * | 4/1992 | Chang et al. | 423/242.7 |
| 5,262,139 A | 11/1993 | Hakka et al. | |
| 5,292,407 A | 3/1994 | Roy et al. | |
| 5,393,505 A | 2/1995 | Audeh | |
| 5,607,594 A | 3/1997 | Pohl et al. | |
| 5,622,681 A * | 4/1997 | Grierson et al. | 423/228 |
| 5,993,608 A | 11/1999 | Abry et al. | |
| 6,267,939 B1 * | 7/2001 | Gemes et al. | 423/228 |

FOREIGN PATENT DOCUMENTS

| | | |
|---|---|---|
| CA | 2246474 | 3/2000 |
| EP | 0 134 948 | 3/1985 |
| EP | 0 548 543 A | 6/1993 |

* cited by examiner

*Primary Examiner*—Timothy C. Vanoy
(74) *Attorney, Agent, or Firm*—Philip C. Mendes da Costa; Bereskin & Parr (57) ABSTRACT

Sulphur dioxide is removed from gas streams by contacting the gas stream with an absorbing medium containing an amine capable of forming an amine salt, heat stable salt and sulfite. The level of heat stable salt is selected such that during the regeneration process of the sulphur dioxide rich amine, the pH of the absorbing medium is at a selected level or below when the level of sulfite in the absorbing medium has been reduced to a specified value. The amine that absorbs the sulphur dioxide has a pKa less than that of sulfite. If the absorbent includes a diamine, then the spent absorbing medium is regenerated under conditions such that at least one amine group remains in salt form.

28 Claims, 4 Drawing Sheets

LOW ENERGY REGENERABLE SO$_2$ SCRUBBING PROCESS

FIELD OF THE INVENTION

This invention relates to an improved process for capture of sulfur dioxide (SO$_2$) from gaseous streams using a regenerable absorbent and, preferably a regenerable diamine absorbent. In one particular embodiment using a regenerable diamine absorbent, the invention relates to a process having an elevated amount of the sorbing nitrogen of the amine partially neutralized into the heat stable salt form.

BACKGROUND OF THE INVENTION

In order to remove SO$_2$ from gaseous streams, it is known to utilize a regenerable process with aqueous monoamine or diamine absorbents. The diamine is exposed to a gas stream to absorb SO$_2$ from the gas stream and to produce an SO$_2$ lean treated gas stream and a spent absorbent steam containing amine SO$_2$ salts. The amine SO$_2$ salts are decomposed in the regenerator tower of the process to gaseous SO$_2$ and the corresponding free base amine under the elevated temperature and the action of stripping steam traveling up the regeneration column, countercurrent to the rich amine flowing downwards. However, the salts of strong acids such as sulfuric, nitric or hydrochloric acid (referred to herein as heat stable salts or HSS) are too stable to decompose under these conditions. If allowed to accumulate, it is known that these heat stable salts would eventually completely neutralize the SO$_2$ absorption capacity of the amine absorbent, stopping the proper functioning of the process. Therefore, as it is known in the art, means for removal of heat stable amine salts are either installed as a part of the process or available on demand.

Accordingly, it is known in the art that a regenerable absorbent for a given acid gas impurity is chosen so that the salt formed by the acid gas with the alkaline absorbent is of moderate strength. See for example, U.S. Pat. Nos. 5,019,361 (Hakka), which discloses the use of a diamine absorbent having an amine with a pKa in the range of 4.5–6.7 and U.S. Pat. No. 5,292,407 (Roy et al). Such a salt, which is generally formed by absorption at 25–70° C., can dissociate into the original acid gas (e.g. SO$_2$) and the alkaline absorbent upon raising the temperature in a standard steam stripping process. By use of a so-called regeneration or stripping tower, wherein the acid gas laden absorbent, i.e. an alkaline absorbent containing the acid gas-absorbent salt, flows downward countercurrent to a flow of steam, the salt is dissociated and the acid gas component is carried overhead with the flow of steam. An overhead condenser is generally utilized to condense most of the steam so that it can be recycled to process as reflux, thereby helping to maintain the water concentration of the absorbent constant. The absorbent in the base of the regeneration tower has been regenerated and is then again suitable for being recycled to an absorber tower for absorption of additional acid gas in the absorber tower.

A suitable indicator for an appropriate choice of absorbent to use for the capture of a given gaseous acid gas contaminant is the difference in the pK$_a$ values between the acid gas and the absorbent. The pK$_a$ of an acid is defined as the negative logarithm to the base 10 of the equilibrium constant K$_a$ for the ionization of the acid HA, where H is hydrogen and A is a radical capable of being an anion:

$$HA \Leftrightarrow H^+ + A^- \qquad (1)$$

$$K_a = [H^+][A^-]/[HA] \qquad (2)$$

$$pK_a = -\log_{10} K_a \qquad (3)$$

For a basic absorbent B, the pK$_a$ is for the ionization reaction of the conjugate protonated acid of B, the species BH$^+$:

$$BH^+ = B + H^+ \qquad (4)$$

The reaction involved in the capture of the acid gas contaminant HA by the basic absorbent B is:

$$HA + B \Leftrightarrow BH^+ + A^- \qquad (5)$$

It can be shown that the logarithm of the equilibrium constant of Reaction 5 is given by the expression $$\Delta pK_a = (pK_a \text{ of the basic absorbent}) - (pK_a \text{ of the acid gas}) \qquad (6)$$

For Reaction 5 to have the appropriate balance of absorbing the acid at relatively low temperatures of 25–70° C. and being regenerable at 100–110° C., the ΔpK$_a$ in Reaction 6 is significant. With respect to the instant invention, the ΔpK$_a$ is preferably in the range 1 to 3. Since these are logarithmic units, the equilibrium constant ranges from 10 to 1000.

According to the current knowledge in the art, two conditions must be satisfied if the absorbed acid in the loaded absorbent can be removed by steam stripping regeneration. Firstly, the salt must be unstable enough to decompose at the regenerator temperature and secondly, the acid gas must be volatile so that it can go overhead with the steam and be physically separated from any absorbent in the overhead off gas stream. If a strong acid contaminant with a pK$_a$ more than 3 units smaller than the absorbent pK$_a$ is present in the feed gas being treated, or if such is formed in the process through chemical reaction, then the salt formed is so stable that it does not decompose easily at the regenerator temperature and the salt is termed a heat stable salt.

Most gas treating processes can experience a buildup of HSS. In the removal of hydrogen sulfide and carbon dioxide from refinery hydrocarbon streams for example, contaminants such as hydrogen cyanide (which can form thiocyanate, SCN$^-$), formic acid, acetic acid and oxygen (which can lead to the formation of thiosulfate) can be present. In regenerable sulfur dioxide (SO$_2$) scrubbing, sulfuric acid (H$_2$SO$_4$) or its anhydride, sulfur trioxide (SO$_3$) are usually present. These acids are so much stronger than the acid gas being removed that they form non-regenerable HSS in the absorbent.

If these HSS are allowed to accumulate, they will eventually totally neutralize the absorbent so that it no longer is able to capture the acid gas as intended. Therefore in systems where HSS occurs, either continuous or intermittent HSS removal is required. Accordingly, it is known in the art to operate to maintain the HSS level in monoamine acid gas absorbents as low as practical to maintain the scrubbing capacity of the process and in particular below one equivalent per mole.

For example, Abry et al (U.S. Pat. No. 5,993,608) discusses the removal of acid components such as CO$_2$ and H$_2$S from natural gas. At column 2, line 37, Abry states that "If the residual buildup of heat-stable salts (HSS) is permitted to build to typical levels in excess of 1% by weight, the amine performance will decline, corrosion increases rapidly with a decline in pH, and the amine solution begins to foam, creating excessive process liquid losses . . . ".

Audeh (U.S. Pat. No. 5,393,505) relates to a process for rejuvenating a spent aqueous alkanolamine subsequent to its use to sorb an acid gas selected from the group consisting of $CO_2$, $H_2S$ or both. Part of the process is to remove inorganic ions from the spent alkanolamine solution. At page 4, lines 14–16, the disclosure states that "The ion concentration in the alkanolamine after the ion removal step are preferably as low as possible."

Roy et al (U.S. Pat. No. 5,292,407) relates to a process for converting HSS to heat regenerable salts. At column 8, lines 17–24, Roy states that "When the absorbent comprises a diamine, such as for sulfur dioxide absorption, the level of heat stable salts in the regenerated absorbent is typically less than about 1 equivalent of heat stable salt per mole of diamine, preferably less than about 0.8 equivalent per mole of diamine and, more preferably, from about 0.1 to 0.6 equivalents per mole of diamine in order to provide absorption capacity to the first amine group in salt form."

Hakka (U.S. Pat. Nos. 5,019,361) relates to the removal of $SO_2$ from a gas stream using an aqueous absorbing medium containing a water-soluble half salt of a diamine. As set out at column 9, line 65-column 10, line 6, after the absorption step, the aqueous absorbing medium is treated in a desorption step ". . . to provide a regenerated absorbing medium containing amine salt absorbent having at least one nitrogen as an amine salt and at least one free sorbing nitrogen. The salt often is at least one of sulphate, chloride, thiosulfate, dithionate, trithionate and pyrosulfite. Advantageously, at least about 90 mole percent, preferably essentially 100 mole percent, of the amine salt absorbent has at least one nitrogen in the salt form in the regenerated absorbing medium". The implication of the preceding is that one nitrogen, the sorbing nitrogen, should be in the free base form and not tied up as a heat stable salt. Accordingly, the rejuvenated aqueous absorbing medium would contain less than 1 equivalent per mole of diamine absorbent of HSS. Further, in Example 3, the synthetic absorbing medium is prepared with 0.96 equivalents of heat stable salt per mole of diamine, again leaving the second, sorbing nitrogen in the free base form.

SUMMARY OF THE INVENTION

It has been found, contrary to current thinking, that the presence of elevated levels of HSS are beneficial, depending upon the amine which is utilized as the absorbent, since they permit the regeneration process to proceed with reduced steam requirements while enhancing the removal of $SO_2$ from the absorbent during the regeneration process. In particular, the current invention is an improvement of the process of Hakka in that it allows a reduction of the steam requirement by controlling the pH during the stripping process by making the absorbent more acidic. In particular, the process is intentionally operated with a level of heat stable salt that produces the desired pH for the absorbent during, preferably, all or essentially all, of the steam stripping step.

Without being limited by theory, it is understood that the following reversible reactions occur when $SO_2$ is absorbed:

$$SO_2 \text{ (gas)} \Leftrightarrow SO_2 \text{ (liquid)} \tag{7}$$

$$SO_2 \text{ (liquid)} + H_2O \Leftrightarrow H^+ + HSO_3^- \tag{8}$$

$$HSO_3^- \Leftrightarrow SO_3^{2-} \tag{9}$$

During the stripping process the reverse reactions occur, Reaction 9, the conversion of bisulfite to sulfite, is favoured at higher, more alkaline conditions. At a pH of 6.9 at 18° C. and in relatively dilute solution, the concentrations of sulfite and bisulfite are equal. At pH 5.9, the ratio is 90% bisulfite, 10% sulfite, at pH 4.9, sulfite constitutes only 1% of the dissolved $SO_2$ while a pH 3.9, sulfite constitutes only 0.1% of the dissolved $SO_2$.

Sulfite is generally not removable by steam stripping. Thus, sulfite in an absorbent represents dissolved $SO_2$ that is not removable by steam stripping. If the pH of the absorbent is too alkaline during the steam stripping process, then the regenerated absorbent will contain an elevated level of sulfite thereby decreasing the efficiency of the process in terms of the amount of $SO_2$ recovered per unit weight of absorbent that is cycled through the absorption/regeneration process.

For example, it has been found that if the regenerated lean absorbent has a pH less than about 5.2 and a dissolved $SO_2$ concentration of less than about 1% by weight, then the treated gas stream may contain less than about 100 ppmv of $SO_2$ while the stripping process uses low steam consumption (e.g. as low as 2 kg per kg of $SO_2$ captured). At pH 5.2, about 5% of the dissolved $SO_2$ is in the form of sulfite, or a total of 500 ppmw.

Figure 1:
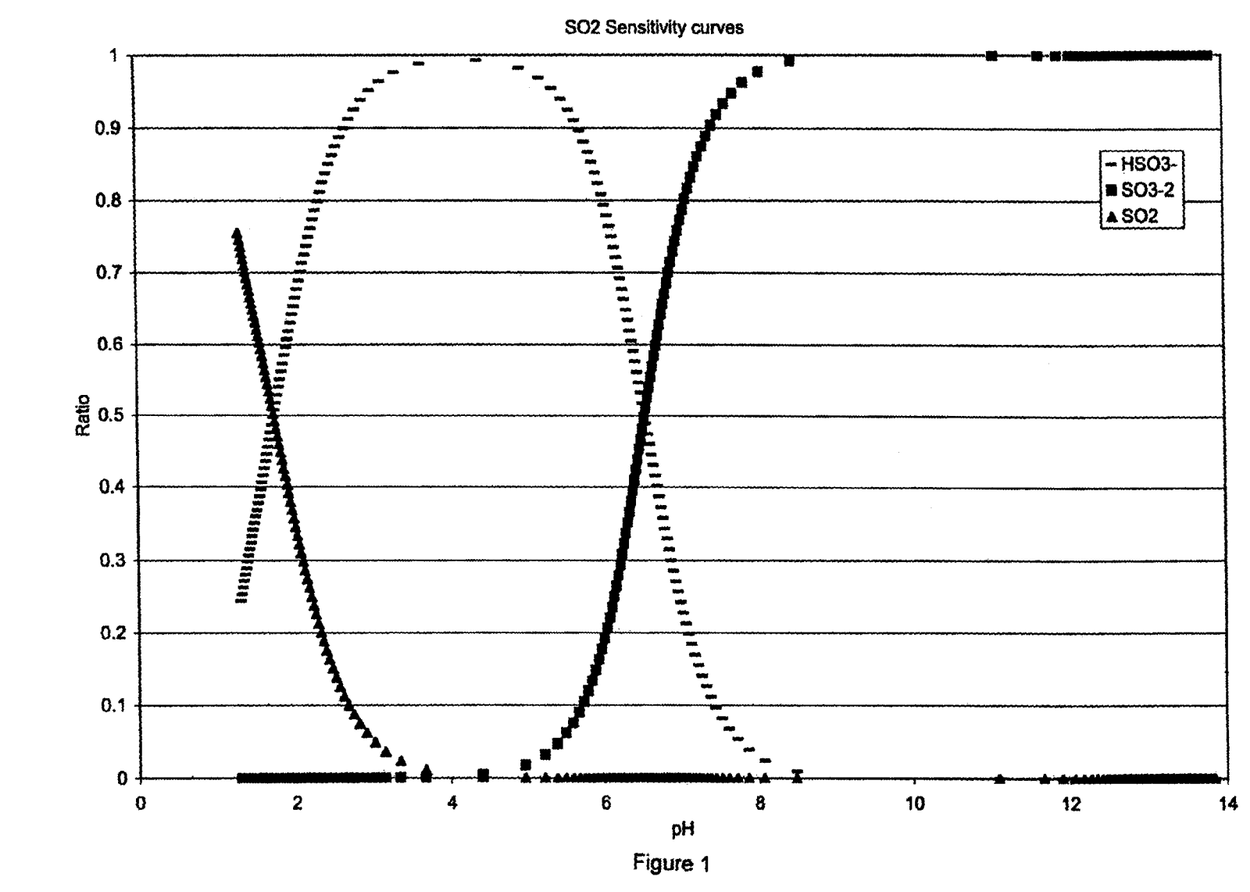
FIG. 1 is a graph of $SO_2$(liquid)/bisulfite/sulfite equilibria at varying pH.

Low energy regeneration of a spent absorbent to a high degree of leanness in the regeneration step of the $SO_2$ rich solvent may be achieved if, during the stripping process, the dissolved $SO_2$ content in the form of sulfite/bisulfite of the lean amine decreases below a desired low value while the pH is still relatively low. If during the stripping the pH becomes too alkaline while the sulfite/bisulfite content is high, the bisulfite tends to convert to sulfite, which is essentially not steam strippable. Thus, $SO_2$ is not strippable from solutions having a pH high enough so that sulfite is the predominant species due to the very low equilibrium concentration of $SO_2$ that is present at such pH, as is illustrated in FIG. 1 which is a graph of $SO_2$(liquid)/bisulfite/sulfite equilibria at varying pH. As can be seen in FIG. 1, at a pH of about 4, a solution will contain essentially no liquid $SO_2$ while, at about the same pH, the sulfite concentration starts to dramatically rise, and the bisulfite concentration (which will convert to $SO_2$ under steam stripping conditions) begins to dramatically decrease as the pH increases.

It will be appreciated that the total level of dissolved $SO_2$ in the regenerated absorbent (i.e. in any of $SO_2$(liquid), bisulfite and sulfite) may be selected based upon the desired content of the regenerated absorbent prior to being introduced into the absorption process. For a given absorbent, the total level of dissolved $SO_2$ in the regenerated absorbent may be varied by adjusting various parameters including the amount of steam delivered to the stripping process, the contact time in the stripping column and the pH of the absorbent during the stripping process. As, at any reaction conditions, $SO_2$(liquid), bisulfite and sulfite are in equilibrium, the process may be operated based on a selected level of total dissolved $SO_2$. The regenerated absorbent may have a dissolved $SO_2$ level, i.e. the sum of sulfite, bisulfite and $SO_2$ (but which may all be reported as "sulfite"), less than 0.5 wt % based on the total weight of the regenerated aqueous absorbing medium, and preferably less than 0.2 wt % based on the weight of the regenerated absorbent.

The low pH should be maintained during a sufficient portion of the regeneration process such that the regenerated absorbent has the desired level of total dissolved $SO_2$ reported as sulfite. Preferably, the absorbent is maintained at the desired pH, or pH range, during all, or at least essentially all, of the regeneration step so as to achieve the selected dissolved $SO_2$ level. The selected pH level is preferably less then 6, more preferably less than 5 and most preferably less than 4.5.

The absorbent has at least one amine group. As the amine is regenerated, the amine $SO_2$ salts are decomposed to $SO_2$ and the corresponding free base amine. The free base amine will increase the alkalinity of the absorbent as it is regenerated. In order to maintain the pH of the absorbent at the desired pH level during the regeneration step, the absorbent is preferably selected such that free base amine is sufficiently weak so as not to raise the pH during the regeneration step above the desired value or by partially neutralizing the amine, if it is too alkaline, with a strong, heat stable acid. This is preferably achieved by maintaining an elevated level of HSS in the absorbent. The amount of HSS will vary depending upon the pKa of the amine group or groups. For example, to maintain a pH of about 5.2, the necessary HSS level is illustrated in Table 1.

TABLE 1

| Amine $pK_a$ | HSS Fraction at pH 5.2 |
|---|---|
| 5.2 | 0.50 |
| 4.2 | 0.10 |
| 3.2 | 0.01 |

Thus, low steam consumption and low concentrations of $SO_2$ in the treated gas can be achieved with various amines.

The absorbent preferably has a pKa of from about 5.5 to about 3.0, more preferably from about 5.0 to about 3.5, and most preferably from about 4.5 to about 3.5. In order to obtain the maximum loading of $SO_2$ in the solvent, an amine $pK_a$ less than about 4.2 is preferred, since most of the buffering capacity of the solvent is still available for capturing $SO_2$. If the absorbent has two or more amine groups, then at least one of the amine groups has a pH in this range. Optionally, the pKa of all of the sorbing amine or amines are preferably in this range.

In a particularly preferred embodiment, the amine has two amine groups, such as disclosed in Hakka. Then, in accordance with this aspect of the instant invention, the process is operated with the sorbing nitrogen of the amine (i.e. the amine with the lower pKa) partially neutralized into the heat stable salt (HSS) form. Thus, the regenerated absorbent will have a substantial amount of HSS compared with conventional processes.

For example, preferred diamines which are used in the CANSOLV® System $DeSO_x$ process are N-(2hydroxyethyl) piperazine N,N'-di(2-hydroxyethyl)piperazine. With such diamines, the lean regenerated absorbent, which is fed to the absorption step, is operated with a heat stable salt concentration of at least 1 equivalents of acid per mole of diamine, preferably from 1.03 to 1.7 equivalents of acid per mole of diamine, more preferably from 1.05 to 1.45 equivalents of acid per mole of diamine and most preferably from 1.1 to 1.3 equivalents of acid per mole of diamine. At a concentration of at least 1 equivalents of acid per mole of diamine, the HSS results in the stronger amine of the diamine being neutralized by the HSS. Preferably, the concentration of the HSS is such that at least a portion of the weaker amine of the diamine is neutralized by the HSS. In an embodiment utilizing the preferred diamines disclosed herein, preferably from 5 to 45% of the weaker amine is neutralized by the HSS and, more preferably, from 10 to 30% of the weaker amine is neutralized by the HSS. In an alternate embodiment, if the amine is stronger, then up to about 70% of the amine may be neutralized. Similarly, if the amine is relatively weak, then only about 3% of the amine may be neutralized.

In the past, it has known that the disproportionation reaction can produce heat stable salts that would eventually completely neutralize the $SO_2$ absorption capacity of the amine absorbent, stopping the proper functioning of the process. In particular, the disproportionation reaction can occur at a rapid rate, thereby resulting in the conversion of sulfite and bisulfite in the aqueous absorbent solution to sulfate, sulfur and thiosulfate. The disproportionation reaction is exothermic, so that the rise in temperature and the increase in acidity can cause degradation of the diamine absorbent at the temperature levels achieved. If the process is not controlled), then the disproportionation reaction can occur at a rate which seems to be autocatalytic and results in a runaway reaction that converts essentially all of the dissolved $SO_2$ in the absorbent solution to sulfate, sulfur and thiosulfate and also cause degradation of the diamine absorbent.

Without being limited by theory, it has now been determined that at low HSS levels, the sulphur dioxide is absorbed in relatively strong amine absorbents as sulphite ion. At elevated pH levels, stripping of a significant proportion of the absorbed sulphur dioxide, which is in sulfite form, becomes difficult to achieve. The presence of the dissolved $SO_2$ permits the disproportionation reaction to occur at a rapid rate thereby permitting the potential degradation of the diamine absorbent. However, it has now been determined that at higher HSS levels, corresponding to a lower pH level, the dissolved $SO_2$ may be removed to relatively low levels (e.g. less than 0.5 wt % and preferably less than 0.2 wt %) by steam stripping. The reaction kinetics for the conversion of dissolved $SO_2$ to sulfate, sulfur and thiosulfate is hypothesized to be expressed as follows:

Rate of disproportionation $\propto$ [dissolved $SO_2$]$^a$

Where the exponent "a" to which the concentration of dissolved $SO_2$ in all forms (sulfite, bisulfite and $SO_2$) is raised is likely greater than 1 and may be 2 or even higher. This results in the reaction rate increasing faster than the concentration of dissolved $SO_2$ species in solution. For example, if a=2, then a doubling of the dissolved $SO_2$ will give a disproportionation rate 4 times faster. Accordingly, when the sulfite is removed by steam stripping at higher HSS levels, the reaction rate of sulfite to sulfate, sulfur and thiosulfate is substantially reduced thus preventing a runaway reaction.

Another advantage of the instant invention is that, by operating at a higher level of HSS, not only is a low $SO_2$ level in the treated gas achievable even when using lower amounts of regeneration steam when the HSS level is >1 equivalent per mole of diamine, but quite surprisingly, the net $SO_2$ removed in terms of moles $SO_2$ per mole of amine is also equal or higher. The reason for this is that more of the sulfite is converted to bisulfite at the resultant lower pH level thereby permitting the dissolved $SO_2$ in the form of bisulfite to be removed by steam stripping.

Diamines used in the CANSOLV® System $DeSO_x$ process, which are preferred, have two amines, one of which has a higher pKa than the other. The one with the higher pKa is stronger and will be protonated before the amine with the lower pKa (the weaker amine) is protonated. As $SO_2$ is absorbed in the absorbent, sulfite is formed. Sulfite acts as a base and has a base strength between that of the stronger and weaker amines. For example, the stronger amine may have a pKA greater than 7.5, preferably greater than 8.0 and the weaker amine may have a pKA less than 5.5, preferably less than 5.0. Sulfite has a pKa of 6.9. It will be noted that there may be an overlap between the base strength of sulfite and that of the weaker amine. The acid forming a HSS will preferentially neutralize the stronger base. Accordingly, if the HSS is at a level such that the stronger amine is fully neutralized, then any additional acid will commence to neutralize the strongest remaining base. If the $SO_2$ sorbing amine has buffering capacity in the pH range above the desired regeneration pH, it will start to be converted to a HSS along with the conversion of the sulfite to bisulfite as the pH is lowered by the addition strong acid. If the level of HSS is raised sufficiently, the desired maximum pH value for regeneration will be reached. At this pH, the ratio of bisulfite to sulfite is sufficiently high so that the desired low dissolved $SO_2$ content of the lean absorbent may be reached during the regeneration process with relatively low steam consumption. Addition of acid to lower the pH further is not desirable since the acid will start to neutralize more of the weaker amine, thereby reducing the capacity for $SO_2$ capture. Accordingly, once the amine system is known, a level of HSS may be selected such that the acid will neutralize or essentially neutralize the high pH portion the weaker amine (the sorbing amine) buffering capacity. Preferably, the HSS does not neutralize more than 70% and more preferably not more than 50% of the sorbing amine. The amount of the sorbing amine which is neutralized will vary based on the strength of the sorbing amine as a base. In order to maintain a lower pH during the stripping process, more of a stronger sorbing amine is preferably neutralized. It will be appreciated that if too much of the amine is neutralized, then, at a certain point, the amount of buffering capacity which is available for sorbing $SO_2$ may be economically unattractive. A very weak amine that has little buffering capacity above the maximum desired regeneration pH is preferred to maximize the solvent $SO_2$ absorption capacity in terms of moles of $SO_2$ absorbed per mole of amine. However, if the amine $pK_a$ is too low, then the absorption process described by Reaction 5 tends not to proceed, making absorption of $SO_2$ difficult.

During the regeneration process, the steam will transport vapor above the liquid upwards in the regeneration column. This decreases the $SO_2$ concentration above the rich or partially rich solvent to below the equilibrium value. In an effort to re-establish the (higher) equilibrium $SO_2$ concentration in the vapor phase, $SO_2$ from the liquid phase will vaporize into the gas phase. The liquid phase equilibria will then tend to maintain their equilibrium values by forming $SO_2$ in the liquid phase from bisulfite, and bisulfite from sulfite. The addition of strong HSS forming acids drives these equilibria towards $SO_2$ by lowering the pH, which converts sulfite to bisulfite to $SO_2$. This has the effect of increasing the vapor phase $SO_2$ concentration which then results in less stripping steam being required to regenerate the amine absorbent to a low dissolved $SO_2$ content.

The concentration of $SO_2$ in the scrubbed feed gas is determined by the approach to equilibrium between the lean amine and the upwardly flowing feed gas at the top of the absorber column. In order to produce a treated gas with a low $SO_2$ content exiting the absorber, the vapor pressure of $SO_2$ over the lean solvent last contacting the feed gas just before exit from the absorber must be at least slightly lower than the desired concentration in the treated gas, since complete equilibration between the gas and liquid phases is not practically achievable. In order to achieve a low $SO_2$ vapor pressure over the lean solvent, either (a) the pH must be high enough so that the equilibria are pushed to maximize the formation of sulfite, or, (b) the concentration of dissolved $SO_2$ must be so low as not to be capable of presenting a high $SO_2$ vapor pressure. It has been found that performing the stripping in accordance with alternative (a) preceding requires a very large specific steam consumption, such as is required in the Wellman-Lord process (e.g., approximately 13 kg steam per kg $SO_2$ captured). Performing the regeneration according to alternative (b) at a lower pH as is described herein allows achieving low concentrations of $SO_2$ (e.g. less than 100 ppmv, preferably less than 50 ppmv and more preferably less than 10 ppmv) in the treated gas with steam use as low as 2–4 kg per kg of $SO_2$.

Operation of the process under alternative (b) discussed in the preceding requires that the amine absorbent and the HSS level are so chosen that in the regeneration process a total dissolved $SO_2$ concentration (being the sum of sulfite, bisulfite and dissolved $SO_2$) of less than about 1% by weight is achieved while the solvent pH is still preferably below about 6, more preferably below 5.0 and most preferably below about 4.5.

In accordance with one aspect of the instant invention, there is provided a cyclic process for the removal of sulphur dioxide from a sulphur dioxide containing gas stream using an absorbent medium and for the regeneration of the absorbent medium comprising (a) contacting the gas stream with a lean aqueous absorbing medium containing a sulphur dioxide absorbent to absorb sulphur dioxide from the gas to form a sulphur dioxide lean treated gas stream and spent absorbing medium;

(b) steam stripping gaseous sulphur dioxide from the spent absorbing medium at a temperature to form a regenerated aqueous absorbing medium;

(c) recovering the gaseous sulphur dioxide;

(d) monitoring the regenerated aqueous absorbing medium and adjusting the level of heat stable salt to maintain the pH of the regenerated aqueous absorbing medium at a selected pH level; and (e) recycling the regenerated aqueous absorbing medium to the contacting step.

In one embodiment, the selected level is 6 or less.

In another embodiment, the selected level is 5 or less.

In another embodiment, the selected pH level is determined based on a targeted concentration of total dissolved $SO_2$ in the regenerated aqueous absorbing medium.

In another embodiment, the targeted concentration of total dissolved $SO_2$ in the regenerated aqueous absorbing medium is less than 1.0 wt % based on the total weight of the regenerated aqueous absorbing medium.

In another embodiment, the targeted concentration of total dissolved $SO_2$ in the regenerated aqueous absorbing medium is less than 0.5 wt % based on the total weight of the regenerated aqueous absorbing medium.

In another embodiment, the absorbent is a diamine that is selected so that, in free base form, the diamine has a molecular weight of less than about 300 and the diamine in half salt form having a pKa value for the free nitrogen atom of about 3.0 to about 5.5, the aqueous absorbing medium containing at least 1 mole of water for each mole of sulphur dioxide to be absorbed and having a heat sable salt concentration of greater than 1 equivalents of acid per mole of diamine prior to the lean aqueous absorbing medium contacting the sulphur dioxide containing gas.

In another embodiment, the absorbent is selected to have a pKa from 3.0 to 5.5 and the selected pH level is 5.5, In another embodiment, the absorbent is selected to have a pKa from 3.2 to 5.0 and the selected pH level is 5, In another embodiment, the absorbent is selected to have a pKa from 3.5 to 4.5 and the selected pH level is 5.

In accordance with another aspect of the instant invention, there is provided a cyclic process for the removal of sulphur dioxide from a sulphur dioxide containing gas stream using an absorbent medium and for the regeneration of the absorbent medium comprising (a) contacting the gas stream with a lean aqueous absorbing medium containing a water-soluble half salt of a diamine to absorb sulphur dioxide from the gas to form a sulphur dioxide lean treated gas stream and spent absorbing medium, the diamine in free base form having a molecular weight of less than about 300 and the diamine in half salt form having a pKa value for the free nitrogen atom of about 3.0 to about 5.5, the aqueous absorbing medium containing at least 1 mole of water for each mole of sulphur dioxide to be absorbed and having a heat sable salt concentration of greater than 1 equivalents of acid per mole of diamine prior to the lean aqueous absorbing medium contacting the sulphur dioxide containing gas;

(b) steam stripping gaseous sulphur dioxide from the spent absorbing medium at a temperature to form a regenerated aqueous absorbing medium;

(c) recovering the gaseous sulphur dioxide; and (d) recycling the regenerated aqueous absorbing medium to the contacting step.

In one embodiment, the gas stream is contacted with the aqueous absorbing medium at a temperature of from about 10° to about 60° C. to absorb sulphur dioxide from the gas stream in amounts of at least about 100 g of sulphur dioxide per kg of absorbing medium, and gaseous sulphur dioxide is stripped from the spent absorbing medium at a temperature of about 50° to about 110° C. and at least about 30° C. greater than the contact temperature to form the regenerated aqueous absorbing medium.

In another embodiment, the heat sable salt concentration of the lean aqueous absorbing medium prior to contacting the sulphur dioxide containing gas is selected to be from 1.03 to 1.7 equivalents of acid per mole of diamine.

In another embodiment, the heat sable salt concentration of the lean aqueous absorbing medium prior to contacting the sulphur dioxide containing gas is selected to be from 1.05 to 1.45 equivalents of acid per mole of diamine.

In another embodiment, the heat sable salt concentration of the lean aqueous absorbing medium prior to contacting the sulphur dioxide containing gas is selected to be from 1.1 to 1.3 equivalents of acid per mole of diamine.

In another embodiment, the heat sable salt concentration is selected to reduce the concentration of sulfur dioxide in the treated gas stream to a selected level.

In another embodiment, the heat sable salt concentration is selected to reduce steam consumption in the steam-stripping step.

In another embodiment, the heat sable salt concentration is selected to reduce steam consumption in the steam stripping step to an amount in the range 25 kg steam/kg $SO_2$ recovered to 2 kg steam/kg $SO_2$ recovered while producing a sulphur dioxide lean treated gas stream having less than 10 ppm $SO_2$.

In another embodiment, the heat sable salt concentration is selected to reduce steam consumption in the steam stripping step to an amount in the range 10 kg steam/kg $SO_2$ recovered to 2 kg steam/kg $SO_2$ recovered while producing a sulphur dioxide lean treated gas stream having less than 50 ppm $SO_2$.

In another embodiment, the heat sable salt concentration is selected to reduce steam consumption in the steam stripping step to an amount in the range 10 kg steam/kg $SO_2$ recovered to 2 kg steam/kg $SO_2$ recovered while producing a sulphur dioxide lean treated gas stream having less than 20 ppm $SO_2$.

In another embodiment, the pH of the regenerated aqueous absorbing medium is monitored and the level of heats stable salts in the aqueous absorbing medium is adjusted to maintain the pH of the regenerated aqueous absorbing medium at a selected level.

In another embodiment, the selected level is 6 or less.

In another embodiment, the selected level is 5 or less.

In accordance with another aspect of the instant invention, there is provided a method of reducing the concentration of sulfur dioxide in a treated gas stream comprising:

(a) contacting a gas stream with an aqueous absorbing medium containing an amine capable of forming an amine salt, heat stable salt and sulfite, the amine having a pKa less than that of sulfite;

(b) stripping gaseous sulphur dioxide from the spent absorbing medium at a temperature to form a regenerated aqueous absorbing medium;

(c) recovering the gaseous sulphur dioxide;

(d) recycling the regenerated aqueous absorbing medium to contacting step (a); and, (e) adjusting the aqueous absorbing medium to have a heat stable salt concentration sufficient to at least essentially neutralize the sulfite in the aqueous absorbing medium.

In one embodiment, the amine is part of a diamine and the method comprises adjusting the heat sable salt concentration of the aqueous absorbing medium to be greater than 1 equivalents of acid per mole of diamine.

In another embodiment, the aqueous absorbing medium contains a water-soluble half salt of a diamine to absorb sulphur dioxide from the gas stream to form a sulphur dioxide lean treated gas stream and a spent aqueous absorbing medium, the diamine in free base form having a molecular weight of less than about 300 and the diamine in half salt form having a pKa value for the free nitrogen atom of about 3.0 to about 5.5, the aqueous absorbing medium containing at least 1 mole of water for each mole of sulphur dioxide to be absorbed and comprising less than about 80 wt. % of water and the method comprises adjusting the heat sable salt concentration of the aqueous absorbing medium to be from 1.05 equivalents of acid per mole of diamine to 1.45 equivalents of acid per mole of diamine.

In another embodiment, the method further comprises adjusting the composition of the aqueous absorbing medium such that the pH of the regenerated aqueous absorbing medium is 6 or less.

In another embodiment, the method further comprises adjusting the composition of the aqueous absorbing medium such that the pH of the regenerated aqueous absorbing medium is 5.0 or less.

In another embodiment, the composition of the aqueous absorbing medium is adjusted by varying the level of heat stable salt in therein.

The amine absorbent may be any of those known in the $SO_2$ recovery art. At least one amine absorbent is used in the processes of this invention which has an amine that has a pKa less than the pKa of sulfite. Preferably, the at least one amine absorbent has at least two amine groups, at least one of which is in the form of a salt and at least one other of which (the "sorbing nitrogen") exhibits a pKa of between about 3.0 and 5.5, preferably from 3.5 to 5.0 and more preferably from 3.5 to 4.5. Because the pKa of an amine varies with temperature, for the sake of uniformity, all pKa measurements are made at 25° C. in an aqueous medium.

Both of the amine groups should preferably be capable of conversion to amine salts in the presence of sulphur dioxide.

As is generally the case, protonating the first amine group will occur under more basic conditions than that when the second amine group is protonated, e.g., the pKa for one amine group will be higher than that for the other, that is, the sorbing nitrogen. Protonating one amine results in an electron withdrawing effect on closely proximate, e.g., amine groups, reducing the pKa for the proximate amine. In accordance with the processes of this invention, the first protonated amine group, which is thus a stronger amine group, is maintained in the salt form. The amine salt, e.g., half salt in the case of diamines, often is substantially non-volatile, so that the amine is not lost during the sulphur dioxide absorption or subsequent regeneration. The half salt is maintained in the salt form during the absorption/desorption cycle since the pH does not reach a high enough value to form a substantial concentration of the free base of the stronger amine.

Because of availability and lower molecular weight, diamines are preferred for the amine salt absorbent. Advantageous diamines (in free amine form) can be represented by the structural formula:

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (e.g., 7 to about 20 carbon atoms), aryl (often monocyclic or bicyclic), alkaryl (e.g., 7 to about 20 carbon atoms), and any of $R^2$, $R^3$, $R^4$, and $R^5$ may form cyclic structures. Diamines are organic compounds containing two nitrogen atoms, and are often preferred due to their commercial availability and generally lower viscosity. The amines, e.g., diamines preferably are tertiary diamines, in view of their stability. However, other diamines in which one or both of the nitrogens is primary or secondary and which otherwise meet the critical parameters discussed below may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate.

To enable a high loading of recoverable sulphur dioxide to be absorbed in the absorbing medium under atmospheric pressure conditions, it is preferable for the free amine form of the amine salt absorbent to have a molecular weight less than about 300, preferably less than about 250. Often the tertiary diamines are of the formula:

wherein $R^1$ is an alkylene group, preferably containing from 2 to 3 carbon atoms as a straight chain or as a branched chain, and each $R^2$ is the same or different and is an alkyl group, preferably methyl or ethyl, or a hydroxy-alkyl group, preferably 2-hydroxyethyl. Specifically preferred compounds are N,N'N'-(trimethyl)-N-(2-hydroxyethyl)-ethylenediamine (pKa=5.7); N,N,N',N'-tetrakis (2-hydroxyethyl) ethylenediamine (pKa=4.9); N,N'-dimethylpiperazine (pKa=4.8); N,N,N',N'-tetrakis (2-hydroxyethyl)-1,3-diaminopropane; N',N'-dimethyl-N,N-bis(2-hydroxyethyl) ethylenediamine; N-(2hydroxyethyl)piperazine and N,N'-di(2-hydroxyethyl)piperazine used either individually or in combination. Also included among the useful diamines are heterocyclic compounds, such as piperazine (pKa=5.8) and 1,4-diazabicyclo[2.2.2]octane ($pK_a$=3.2). The pKa values are for the sorbing nitrogen. In accordance with this embodiment of the invention, the stronger amine group is neutralized by HSS and therefore the weaker amine group is referred to as a "sorbing nitrogen".

The absorbing medium preferably contains at least one mole of water and usually more for each mole of sulphur dioxide to be removed from the gas stream. The water acts both as a solvent for the amine salt and as for a reactant to produce "sulphurous acid" $H_2SO_3$ from the sulphur dioxide. The proportion of water present may be up to about 80 weight percent of the absorbing medium and preferably about 25 to about 75 weight percent of the absorbing medium.

It is not essential that the amine salt absorbent and water be miscible under any of the conditions of the process, nor is it essential that the amine salt absorbent be liquid under all the conditions of the process. Frequently, the solubility of the amine salt absorbent in water is at least about 0.01, often at least about 0.1, mole per liter at 25° C. Preferably, the amine salt absorbent is miscible with water under the conditions in the process.

The amine absorbent (calculated as the free amine) may comprise at least about 20 weight percent of the absorbing medium, preferably about 20 to 90, and more preferably about 25 to 75, weight percent of the absorbing medium. The amount of amine absorbent is preferably in an amount sufficient to provide a spent absorbing medium containing at least about 50 grams of sulphur dioxide per kilogram of absorbing medium. The amount of amine absorbent, however, should not be so great as to either (a) unduly increase the viscosity of the absorbing medium such that undesirable pressure drops are incurred in the gas stream passing through an absorber vessel or (b) render the absorbing medium difficult to atomize, in e.g., a Waterloo scrubber. Preferably, the viscosity of the absorbing medium is below about 1200 centipoise at 25° C., e.g., between about 1 and 500 centipoise at 25° C.

The absorbing medium may contain mixtures of amine absorbents and/or mixtures of amine absorbents with other amine absorbents such as triethanolamine, dimethylaniline, xylidines, monoethanolamine and diethanolamine. Other components, e.g., alkali salts, may be present as additives to, for instance, retard sulphite or bisulphite oxidation, maintain pH and serve as cosolvents The absorbing medium is contacted with the gas containing the sulphur dioxide. Any convenient gas-liquid contacting apparatus may be used. Illustrative contacting devices include countercurrent absorption columns including packed columns and tray columns; countercurrent or cocurrent spray columns including Waterloo scrubbers; venturi scrubbers; thin film contactors and semipermeable membranes.

The amount of absorbing medium employed per unit volume of gas and contact time are at least sufficient to effect removal of substantially all the sulphur dioxide from the gas stream, or to leave a desired residual amount, e.g., less than 500 ppmv, preferably less than 200 ppmv, even less than 100 ppmv, sulphur dioxide. The process is applicable to any sulphur dioxide containing gas stream, e.g., up to 20 or 50 volume percent sulphur dioxide, but is particularly useful for application to flue gas streams from thermal generating plants, which contain about 700 to about 5000 ppmv sulphur dioxide, typically about 1000 to 3000 ppmv sulphur dioxide. In a preferred embodiment, the gas stream to be contacted with the absorbing medium is at least about at 90 percent saturation with water to prevent undue dehydration of the absorbing medium, although in some cases a relatively water-unsaturated gas may be contacted with the amine absorbing medium in order to save capital investment or minimize the space required. Advantageously, the gas is relatively free from particulates such as fly ash to minimize fouling of the gas-liquid contact equipment or providing materials that might catalyze the disproportionation reaction or the oxidation of sulphite or bisulphite.

The contact of the absorbing medium with the sulphur dioxide-containing gas stream is preferably effected within the temperature range from the freezing point of the absorbent up to about 75° C., preferably about 10° C. to about 60° C., more preferably about 10° C. to about 50° C., and is preferably effected to obtain a loading of sulphur dioxide of at least 50 grams of sulphur dioxide per kilogram of absorbing medium, preferably about 200 to about 400.

In accordance with another aspect of the instant invention, the pH of the absorbing medium is preferably in the range of about 6.0 to about 3.0, more preferably in the range of about 5.7 to about 3.0 and most preferably in the range of about 5.5 to about 3.0 during the absorption process. Usually the lean absorbing medium initially has a pH close to the upper end of this range, while the pH of the $SO_2$ rich amine is on the low end and is determined by the absorption conditions, particularly the partial pressure of $SO_2$ in the feed gas and the absorption temperature. Thus, as sulphur dioxide is absorbed and the solution tends to become more acidic, the pH moves towards the lower end of the range.

In order to enhance the removal of sulphur dioxide and facilitate stripping and regeneration of the amine absorbent, a low temperature for the absorption which enables significant absorption of sulphur dioxide is most desired. As the absorption temperature is increased, the amount of sulphur dioxide absorbed per mole equivalent of sorbing nitrogen is decreased. Advantageously, the sorbing amine used in the processes of this invention, given their pKa values of between about 3.0 and 5.5, are relatively weak bases and hence can be regenerated with less energy consumption and at a lower temperature than are stronger bases. To provide sufficient sulphur dioxide absorption, a temperature is preferably used which, under "reference conditions", enables at least about 0.1, preferably at least about 0.2, mole of sulphur dioxide to be reversibly absorbed per mole equivalent of sorbing nitrogen. Reference conditions are intended to provide a guide for the selection of the maximum preferred temperature of the absorption and do not necessarily relate to the specific conditions that may be present in the absorption system. Reference conditions are defined as using a feed stream having a partial pressure of 2 millimeters of mercury of sulphur dioxide.

The time of contact between the gas and absorbing liquid will depend upon the intimacy of contact between the phases and the rate of transfer of the sulphur dioxide into the liquid phase. For spray-type scrubbers, the contact time may be less than 1 or 2 seconds. With absorption columns, the contact time may be 30 seconds or more. The pressure may vary widely, e.g., from subatmospheric to superatmospheric pressures. Since higher pressures increase the partial pressure of a given concentration of sulphur dioxide, they are favored from a thermodynamic standpoint. However, in many instances the gas to be treated is at a pressure slightly higher or lower than the ambient pressure and raising the pressure is economically undesirable. The processes of this invention, however, are particularly advantageous at near ambient pressure, i.e., within 0.5, e.g., within 0.1, atmosphere of the ambient pressure.

The ability to obtain a high degree of loading combined with the ability subsequently to remove all or essentially all, of the absorbed sulphur dioxide leads to a highly economic process in terms of both capital and operating cost.

Removal (recovery) of the absorbed sulphur dioxide from the spent absorbing medium to regenerate the absorbing medium and to provide the sulphur dioxide as a concentrated gas stream is effected at controlled pH conditions in any convenient manner. The desorption may be conducted under any temperature and pressure conditions known in the art. It is generally desirable to maintain a differential in temperature between the absorption and desorption steps of at least about 30° C., and the desorption temperature is frequently less than about 110° C., e.g., about 50° C. to about 110° C., to provide a driving force for the desorption.

Desorption is preferably effected by gaseous stripping using steam generated in situ or by passing an inert gas through the spent absorbing medium, usually at near atmospheric pressure. Lower pressures somewhat favor desorption. The amount of stripping gas may vary from 0 to about 100 liters per liter of absorbing medium. During stripping, the amine salt at the sorbing nitrogen is returned to it basic form while sulphur dioxide, thought to be present as mainly as sulfite and bisulphite ions in the spent absorbing medium, is released from the aqueous medium as gaseous sulphur dioxide. For an economic cyclic process, the ratio of sulphur dioxide absorbed to sulphur dioxide desorbed is preferably about 1:1. During stripping, the pH of the solution usually rises as the acidic sulphur dioxide is removed. As noted earlier, since the HSS is relatively non-volatile, it resists volatilization during stripping thus limiting the pH increase of the absorbent during the regeneration process. The conditions maintained during the stripping operation are selected to achieve the desired level of regeneration of the absorbent (e.g. the level of dissolved $SO_2$ left in the absorbent).

In advantageous aspects of this invention, the amount of steam required per unit of sulphur dioxide recovered can be substantially less than the amount required in typical commercial processes (e.g., in the range of about 2 to 20 kilograms of steam per kilogram of sulphur dioxide recovered) while obtaining low $SO_2$ levels in the treated gas stream (e.g. less than 100 ppmv). Another advantageous aspect of this invention is the ability of the preferred amine absorbents to reversibly remove more than 1000, and even more than 3000 moles of $SO_2$ per mole of amine before degrading to non-functional species.

The stripped, regenerated absorbing medium containing the amine salt absorbent is recycled to the absorbing step, while the gaseous sulphur dioxide is further processed as desired. For example, the sulphur dioxide may be converted into sulphuric acid for sale as a by-product of the process.

BRIEF DESCRIPTION OF THE DRAWINGS

These and other advantages of the instant inventions will be understood in accordance with the following description of a preferred embodiment of the instant invention in which.

DETAILED DESCRIPTION OF THE INVENTION

Figure 2:
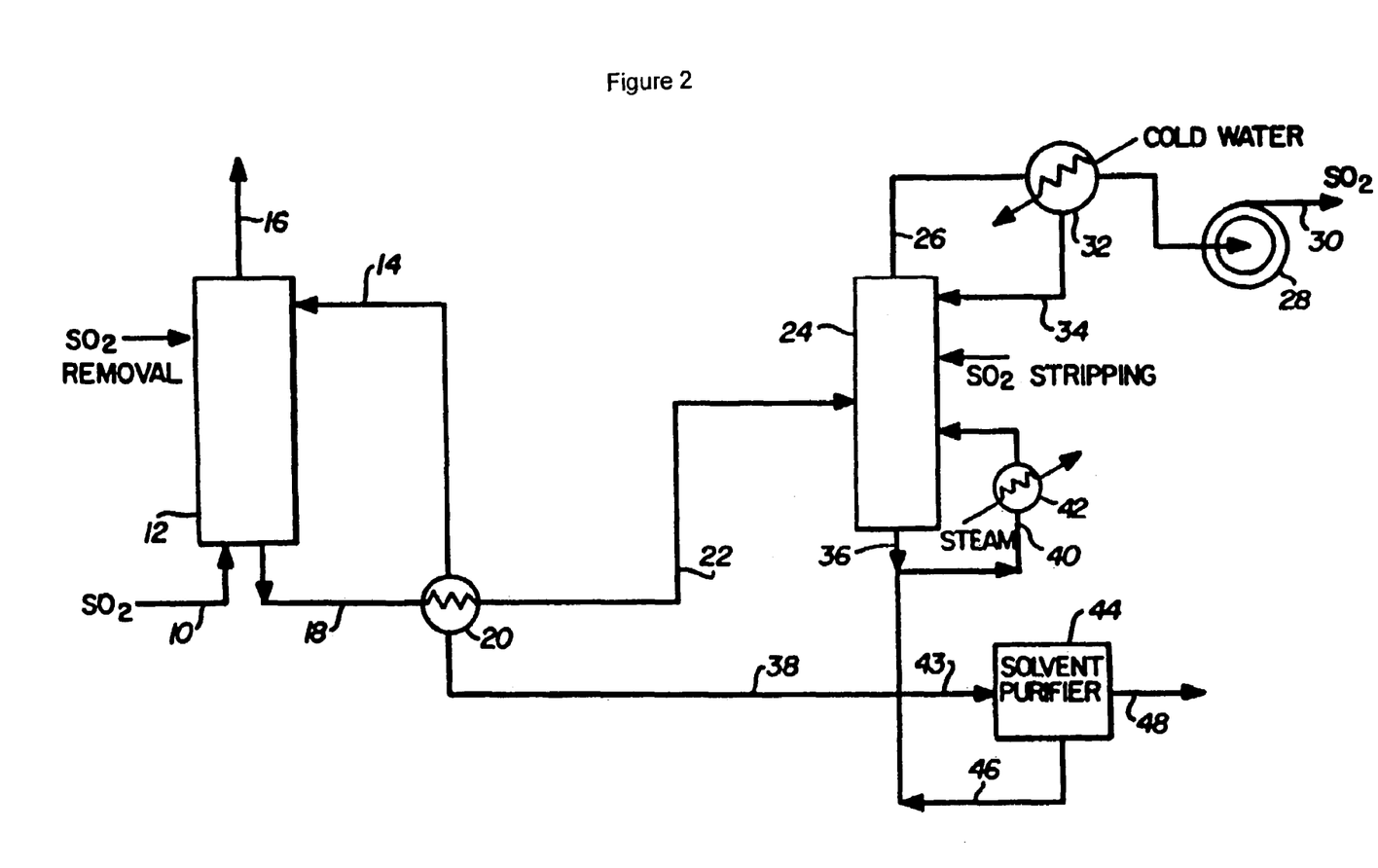
FIG. 2 is a simplified flow sheet of a cyclic process according to one embodiment of the invention.

As shown in FIG. 2, sulphur dioxide-laden gas stream in line 10 is fed to a gas-liquid contact apparatus 12 wherein the gas stream is contacted with lean recycled aqueous absorbing medium fed to the contact apparatus 12 by line 14 to effect absorption of sulphur dioxide from the gas stream, so as to form a sulphur dioxide-depleted product gas stream (i.e. the treated gas stream) which leaves the contact apparatus 12 by line 16 for further processing as desired, before venting via a chimney, a flare stack or the like. Any desired form of gas-liquid contacting apparatus may be employed consistent with the aim of efficiently removing sulphur dioxide from the gas stream and absorption in the absorbing medium.

Spent absorbing medium containing dissolved sulphur dioxide is removed from the contact apparatus 12 by line 18 and, after optionally passing through a lean-rich heat exchanger 20 to heat lean solvent in line 14, is passed by line 22 to a stripping apparatus 24.

The stripping apparatus, which commonly takes the form of a packed or tray column, communicates by line 26 to a vacuum pump or blower 28 to maintain the stripping column 24 either under a subatmospheric or positive pressure and to discharge recovered sulphur dioxide from the system by line 30. The product gas stream in line 26 passes through a heat exchanger 32 fed by cold water to condense water from the product gas stream for recycle by line 34 to the stripping column 24.

Regenerated absorbing medium is recovered from the stripping column by line 36 and is preferably recycled by line 38 to the heat exchanger 20 and, from there, to line 14. A portion of the regenerated absorbing medium in line 36 is preferably recycled by line 40 through a reboiler 42 to the stripping column 24 to maintain the stripping column at the regeneration temperature.

Heat stable salts are produced by oxidation or disproportionation of the sulphur dioxide or by the ingress of strong acids with the feed gas and these salts accumulate in the cyclic system. Any excess amount of these salts may be removed by any means known in the art such as by diverting a portion of the regenerated absorbing medium in line 36 to a solvent purifier system 44 by line 43. The purified solvent is recycled to line 38 by line 46 and the removed heat stable salts are removed by line 48. Any desired procedure may be employed to effect removal of heat stable salts, such as reaction with lime or hydrated lime, ion exchange, electrodialysis or by the addition of strong base followed by distillation of free amine.

In accordance with the instant invention, the amount of flow diverted to line 36 and/or the length of time that solvent purifier system 44 is operated (its duty cycle) may be adjusted at steady state conditions, to maintain the selected level of HSS in the absorbent. For example, the pH or other parameters of the regenerated absorbent may be routinely measured. These measurements may be taken, e.g., proximate the exit of the stripping apparatus 24 or adjacent the inlet to the contact apparatus 12. If the level of HSS is too low, then additional HSS or a HSS precursor (e.g. a strong acid) may be added or allowed to accumulate or, alternately, if the level of HSS is too high, then the process is adjusted to remove additional HSS from the absorbent. Accordingly, the selected parameter is preferably measured upstream of line 36 so that absorbent, or additional absorbent, may be fed to solvent purifier system 44.

In one preferred embodiment, the pH of the absorbent at the end of the regeneration process is selected based on the desired degree of total dissolved $SO_2$ in solution at the end of the regeneration process. At the end of the regeneration process, the absorbent may contain less than 1%, preferably less than 0.5 and most preferably less than 0.2 wt % of total dissolved $SO_2$. This may be determined by any suitable analysis method such as ion chromatography. The pH of the regenerated absorbent may then be measured and the level of HSS adjusted to maintain the preselected pH of the regenerated absorbent.

The procedure is cyclic in operation, with absorbing medium cycling between absorption and desorption of sulphur dioxide to provide purified stack gases and a concentrated sulphur dioxide stream for further processing.

EXAMPLES

Example 1

Figure 3:
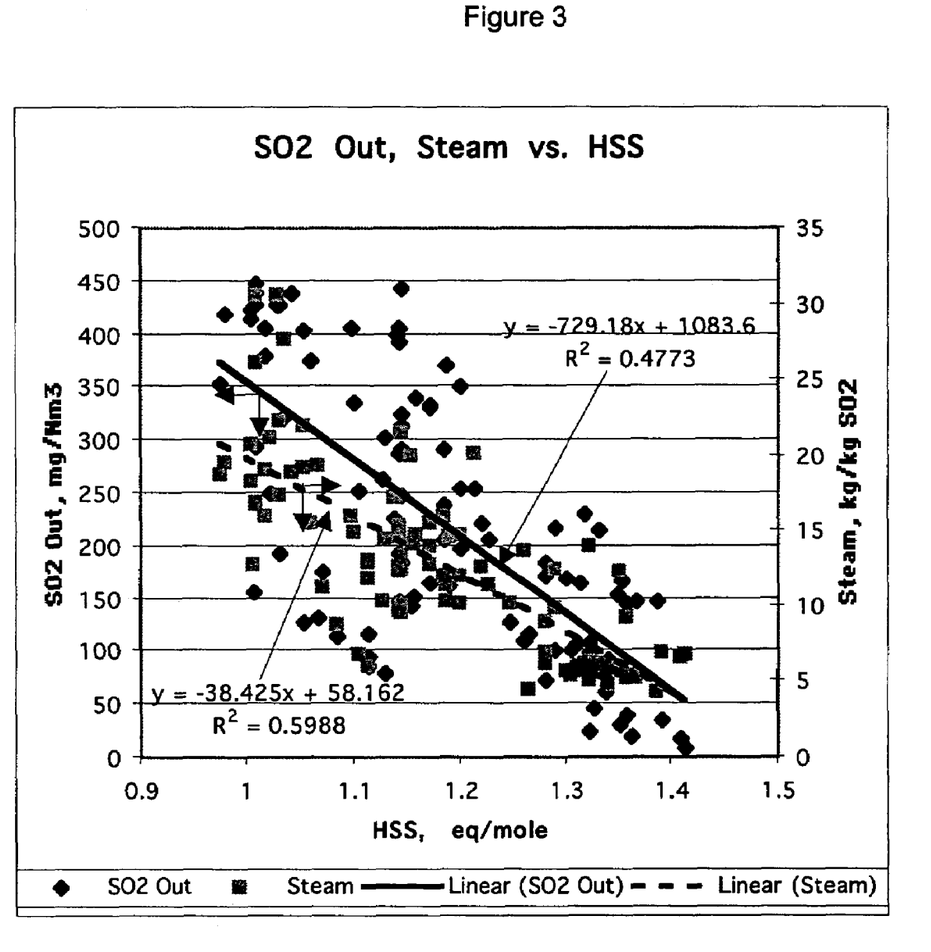
FIG. 3 is a plot of concentration of $SO_2$ in the treated gas vs. the HSS level and also the steam usage vs. HSS; and, FIG. 4 is a plot of the value of kilograms of $SO_2$ picked up per cubic meter of solvent circulated for the same data set as in the graph of FIG. 3

A full scale plant operating the CANSOLV® System DeSO$_x$ process was designed to process 11,000 Nm$^3$/h of gas at a temperature of $\leq 65°$ C. The absorbent was a diamine solvent sold under the trade mark CANSOLV ABSORBENT DS™ absorbent and the unit was operated at the following conditions: lean amine flow of 10 to 13 m$^3$/hr at an amine concentration of about 25% wt; stripper pressure of about 0.1 bar gauge. The feed gas design $SO_2$ content was 40.9 g/Nm$^3$. The plant was operated over a range of gas flows, $SO_2$ contents and at a range of HSS levels. FIG. 3 shows a plot of concentration of $SO_2$ in the treated gas vs. the HSS level and also the steam usage vs. HSS. As is evident from the linear regression trend lines shown in FIG. 3, as the HSS level increases, both the steam requirement and the $SO_2$ concentration in the treated gas decrease quite remarkably.

Figure 4:
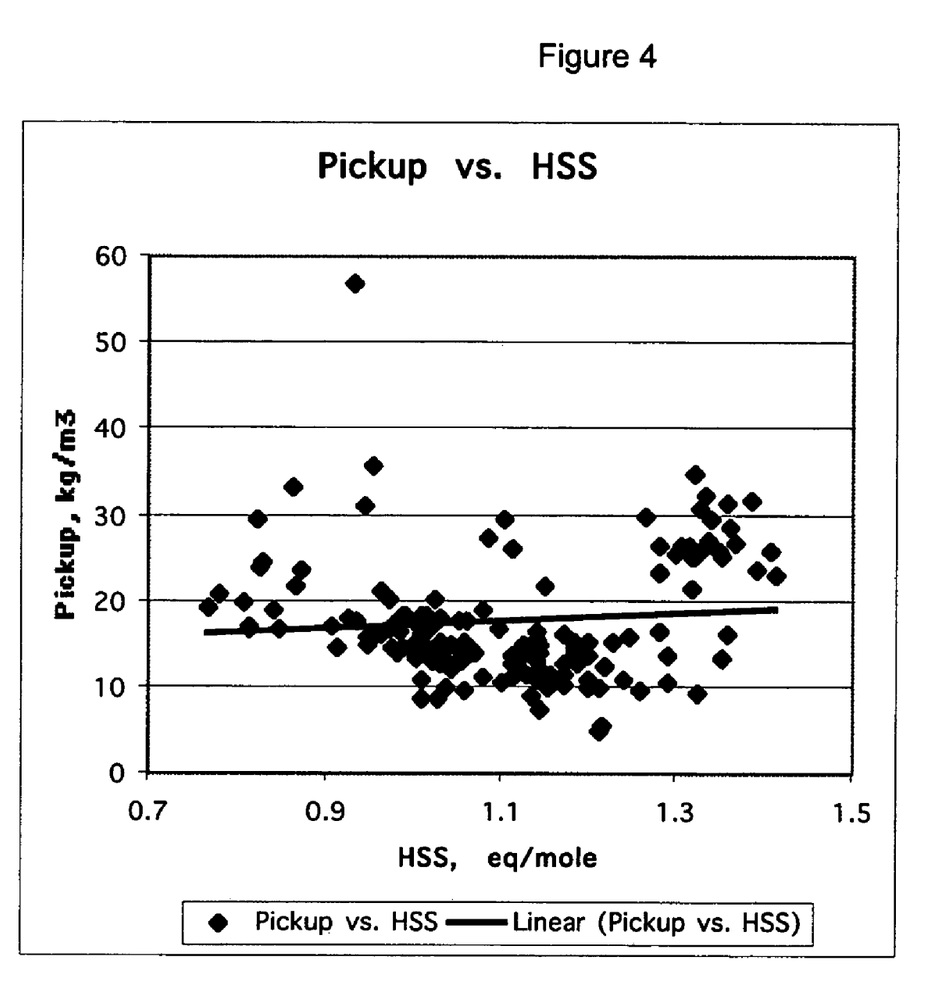

FIG. 4 shows the value of kilograms of $SO_2$ picked up per cubic meter of solvent circulated for the same data set as in FIG. 3. The unit was not operated to minimize the solvent flow, or conversely, to maximize the pickup per volume of solvent, but rather was operated at relatively constant solvent flow independent of the flow or concentration of $SO_2$ in the feed gas. Contrary to expectation, the trend line does not show a decrease in the $SO_2$ absorption per unit volume of solvent as the HSS level increases from 0.75 to 1.45 equivalents per mole. This is especially surprising since it would be expected that with HSS<1, sulfite would be present as the anion of the first, strong nitrogen. It is known that sulfite is capable of reversibly absorbing $SO_2$, forming bisulfite. Absorption of $SO_2$ by sulfite is the basis of the Wellman-Lord process:

$$SO_3^= + SO_2 + H_2O \Leftrightarrow 2\ HSO_3^- \qquad (7)$$

However, since higher loadings were not achieved at the low HSS levels, it is hypothesized that insufficient steam was used to fully strip $SO_2$ from the bisulfite anion neutralizing the stronger amine in the rich solvent.

Example 2

A pilot unit with a feed gas capacity of about 100 $Nm^3/h$ was used. The absorbent was CANSOLV ABSORBENT DM™ absorbent and the unit was operated at the following conditions: feed gas $SO^2$ content about 9% volume, scrubber temperature about 50° C. and amine concentration of 20–30% by weight.

At a HSS level of about 0.6 equivalents/mole of amine, the HSS formation rate was about 10 times higher than when operating at about 1.0 equivalents/mole. Therefore, it was demonstrated that operation using a diamine at HSS levels below about 1.0 equivalents per mole is undesirable.

The invention claimed is:

1. A cyclic process for the removal of sulphur dioxide from a sulphur dioxide containing gas stream using an amine absorbent medium and for the regeneration of the absorbent medium comprising
   a) contacting the gas stream with a lean aqueous absorbing medium containing a sulphur dioxide absorbent to absorb sulphur dioxide from the gas to form a sulphur dioxide lean treated gas stream and spent absorbing medium;
   b) steam stripping gaseous sulphur dioxide from the spent absorbing medium at a temperature to form a regenerated aqueous absorbing medium;
   c) recovering the gaseous sulphur dioxide;
   d) adjusting the level of heat stable salt to maintain the pH of the aqueous absorbing medium during the steam stripping process at 6 or less; and
   e) recycling the regenerated aqueous absorbing medium to the contacting step.

2. The process as claimed in claim 1 wherein the pH level is 5 or less.

3. The process as claimed in claim 1 wherein the pH level is determined based on a targeted concentration of total dissolved $SO_2$ in the regenerated aqueous absorbing medium.

4. The process as claimed in claim 3 wherein the targeted concentration of total dissolved $SO_2$ in the regenerated aqueous absorbing medium is less than 1.0 wt % based on the total weight of the regenerated aqueous absorbing medium.

5. The process as claimed in claim 3 wherein the targeted concentration of total dissolved $SO_2$ in the regenerated aqueous absorbing medium is less than 0.5 wt % based on the total weight of the regenerated aqueous absorbing medium.

6. The process as claimed in claim 1 wherein the absorbent is a diamine that is selected so that, in free base form, the diamine has a molecular weight of less than about 300 and the diamine in half salt form has a pKa value for the free nitrogen atom of about 3.0 to about 5.5, the aqueous absorbing medium containing at least 1 mole of water for each mole of sulphur dioxide to be absorbed and having a heat stable salt concentration of greater than 1 equivalents of acid per mole of diamine prior to the lean aqueous absorbing medium contacting the sulphur dioxide containing gas.

7. The process as claimed in claim 1 wherein the absorbent is selected to have a pKa from 3.0 to 5.5 and the selected pH level is 5.5 or less.

8. The process as claimed in claim 1 wherein the absorbent is selected to have a pKa from 3.2 to 5.0 and the selected pH level is 5 or less.

9. The process as claimed in claim 1 wherein the absorbent is selected to have a pKa from 3.5 to 4.5 and the selected pH level is 5 or less.

10. The process as claimed in claim 1 wherein the absorbent has an amine with a lower pKa and an amine with a higher pKa and the aqueous absorbing medium has a heat stable salt concentration to neutralize the amine with a higher pKa prior to the lean aqueous absorbing medium contacting the sulphur dioxide containing gas.

11. The process as claimed in claim 1 wherein the absorbent is a diamine having a weaker amine and a stronger amine and the aqueous absorbing medium has a heat stable salt concentration sufficient to neutralize the stronger amine and a portion of the weaker amine prior to the lean aqueous absorbing medium contacting the sulphur dioxide containing gas.

12. The process as claimed in claim 1 wherein the heat stable salt concentration of the lean aqueous absorbing medium prior to contacting the sulphur dioxide containing gas is selected to be from 1.03 to 1.7 equivalents of acid per mole of diamine.

13. A cyclic process for the removal of sulphur dioxide from a sulphur dioxide containing gas stream using an absorbent medium and for the regeneration of the absorbent medium comprising
   a) contacting the gas stream with a lean aqueous absorbing medium containing a water-soluble half salt of a diamine to absorb sulphur dioxide from the gas to form a sulphur dioxide lean treated gas stream and spent absorbing medium, the diamine in free base form having a molecular weight of less than about 300 and the diamine in half salt form having a pKa value for the free nitrogen atom of about 3.0 to about 5.5, the aqueous absorbing medium containing at least 1 mole of water for each mole of sulphur dioxide to be absorbed and having a heat stable salt concentration of greater than 1 equivalents of acid per mole of diamine prior to the lean aqueous absorbing medium contacting the sulphur dioxide containing gas;
   b) steam stripping gaseous sulphur dioxide from the spent absorbing medium at a temperature to form a regenerated aqueous absorbing medium;
   c) recovering the gaseous sulphur dioxide;
   d) recycling the regenerated aqueous absorbing medium to the contacting step
   e) adjusting the level of heats stable salts in the aqueous absorbing medium to maintain the pH of the regenerated aqueous absorbing medium at 6 or less during the steam stripping process.

14. The process as claimed in claim 13 wherein the gas stream is contacted with the aqueous absorbing medium at a temperature of from about 10° to about 60° C. to absorb sulphur dioxide from the gas stream in amounts of at least about 100 g of sulphur dioxide per kg of absorbing medium, and gaseous sulphur dioxide is stripped from the spent absorbing medium at a temperature of about 50 to about 110° C. and at least about 30° C. greater than the contact temperature to form the regenerated aqueous absorbing medium.

15. The process as claimed in claim 13 wherein the heat stable salt concentration of the lean aqueous absorbing medium prior to contacting the sulphur dioxide containing gas is selected to be from 1.03 to 1.7 equivalents of acid per mole of diamine.

16. The process as claimed in claim 13 wherein the heat stable salt concentration of the lean aqueous absorbing medium prior to contacting the sulphur dioxide containing gas is selected to be from 1.05 to 1.45 equivalents of acid per mole of diamine.

17. The process as claimed in claim 13 wherein the heat stable salt concentration of the lean aqueous absorbing medium prior to contacting the sulphur dioxide containing gas is selected to be from 1.1 to 1.3 equivalents of acid per mole of diamine.

18. The process as claimed in claim 13 wherein the heat stable salt concentration is selected to reduce the concentration of sulfur dioxide in the treated gas stream to a selected level.

19. The process as claimed in claim 13 wherein the heat stable salt concentration is selected to reduce steam consumption in the steam-stripping step.

20. The process as claimed in claim 13 wherein the heat stable salt concentration is selected to reduce steam consumption in the steam stripping step to an amount in the range 25 kg steam/kg $SO_2$ recovered to 2 kg steam/kg $SO_2$ recovered while producing a sulphur dioxide lean treated gas stream having less than 10 ppm $SO_2$.

21. The process as claimed in claim 13 wherein the heat stable salt concentration is selected to reduce steam consumption in the steam stripping step to an amount in the range 10 kg steam/kg $SO_2$ recovered to 2 kg steam/kg $SO_2$ recovered while producing a sulphur dioxide lean treated gas stream having less than 50 ppm $SO_2$.

22. The process as claimed in claim 13 wherein the heat stable salt concentration is selected to reduce steam consumption in the steam stripping step to an amount in the range 10 kg steam/kg $SO_2$ recovered to 2 kg steam/kg $SO_2$ recovered while producing a sulphur dioxide lean treated gas stream having less than 20 ppm $SO_2$.

23. The process as claimed in claim 13 wherein the pH level is 5 or less.

24. A method of reducing the concentration of sulfur dioxide in a treated gas stream comprising:
   a) contacting a gas stream with an aqueous absorbing medium containing an amine capable of forming an amine salt, heat stable salt and sulfite, the amine having a pKa less than that of sulfite;
   b) stripping gaseous sulphur dioxide from the spent absorbing medium at a temperature to form a regenerated aqueous absorbing medium;
   c) recovering the gaseous sulphur dioxide;
   d) recycling the regenerated aqueous absorbing medium to contacting step (a); and,
   e) adjusting the heat stable salt concentration of the aqueous absorbing medium to have a heat stable salt concentration sufficient to favour dissolved $SO_2$ being in the form of bisulfite and not sulfite during stripping of gaseous sulphur dioxide from the spent absorbing medium and-the pH of the regenerated aqueous absorbing medium is 6 or less during the steam stripping process.

25. The method as claimed in claim 24 wherein the amine is part of a diamine and the method comprises adjusting the heat stable salt concentration of the aqueous absorbing medium to be greater than 1 equivalents of acid per mole of diamine.

26. The method as claimed in claim 24 wherein the aqueous absorbing medium contains a water-soluble half salt of a diamine to absorb sulphur dioxide from the gas stream to form a sulphur dioxide lean treated gas stream and a spent aqueous absorbing medium, the diamine in free base form having a molecular weight of less than about 300 and the diamine in half salt form having a pKa value for the free nitrogen atom of about 3.0 to about 5.5, the aqueous absorbing medium containing at least 1 mole of water for each mole of sulphur dioxide to be absorbed and comprising less than about 80 wt % of water and the method comprises adjusting the heat stable salt concentration of the aqueous absorbing medium to be from 1.05 equivalents of acid per mole of diamine to 1.45 equivalents of acid per mole of diamine.

27. The method as claimed in claim 24 wherein the method further comprises adjusting the aqueous absorbing medium to have a heat stable salt concentration sufficient such that dissolved $SO_2$ is at least essentially in the form of bisulfite and not sulfite.

28. The method as claimed in claim 24 wherein the method further comprises adjusting the composition of the aqueous absorbing medium such that the pH of the regenerated aqueous absorbing medium is 5.0 or less.

* * * * *